US010598786B2

(12) United States Patent
Wang et al.

(10) Patent No.: US 10,598,786 B2
(45) Date of Patent: Mar. 24, 2020

(54) OBJECT STATE DETERMINING APPARATUS AND OBJECT STATE DETERMINING METHOD

(71) Applicant: PixArt Imaging Inc., Hsin-Chu (TW)

(72) Inventors: Wei-Chung Wang, Hsin-Chu (TW); Hui-Hsuan Chen, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 86 days.

(21) Appl. No.: 15/632,390

(22) Filed: Jun. 25, 2017

(65) Prior Publication Data

US 2018/0372871 A1 Dec. 27, 2018

(51) Int. Cl.
| G06F 3/042 | (2006.01) |
| G01S 17/50 | (2006.01) |
| G06F 3/01 | (2006.01) |
| G01S 7/48 | (2006.01) |
| G01S 7/481 | (2006.01) |
| G01S 17/46 | (2006.01) |
| G01S 17/88 | (2006.01) |

(52) U.S. Cl.
CPC ............ *G01S 17/50* (2013.01); *G01S 7/4802* (2013.01); *G01S 7/4815* (2013.01); *G01S 7/4816* (2013.01); *G01S 17/46* (2013.01); *G01S 17/88* (2013.01); *G06F 3/014* (2013.01); *G06F 3/017* (2013.01)

(58) Field of Classification Search
CPC .......... G01S 17/50; G06F 3/017; G06F 3/014; G06F 3/01; G06F 3/011; G06F 3/0304; G06F 3/0308; G06F 3/0325
See application file for complete search history.

(56) References Cited

U.S. PATENT DOCUMENTS

| 6,304,840 | B1 | 10/2001 | Vance | |
| 7,551,814 | B1* | 6/2009 | Smits | .................. G06F 3/03547 345/173 |
| 9,477,310 | B2 | 10/2016 | El Fadili | |
| 2012/0312956 | A1* | 12/2012 | Chang | ..................... G06F 3/017 250/201.1 |
| 2014/0098018 | A1 | 4/2014 | Kim | |
| 2015/0022439 | A1* | 1/2015 | Alameh | .................. G06F 3/017 345/156 |
| 2015/0084884 | A1 | 3/2015 | El Fadili | |

(Continued)

FOREIGN PATENT DOCUMENTS

| EP | 2904472 | 3/2016 |
| EP | 3035164 | 6/2016 |

*Primary Examiner* — Adam R. Giesy
(74) *Attorney, Agent, or Firm* — Winston Hsu

(57) ABSTRACT

An object state determining apparatus comprising: a first light source, configured to generate first light in a first direction, wherein first reflected light is generated while the first light is emitted to an object; a second light source, configured to generate second light in a second direction, wherein second reflected light is generated while the second light is emitted to the object; at least one light sensor, configured to sense a first light amount of the first reflected light and a second light amount of the second reflected light; and a determining unit, configured to determine a state of the object based on the first light amount and the second light amount. The object state determining apparatus can be easily fixed to an object to be detected and can efficiently detect the state of the object.

30 Claims, 9 Drawing Sheets

(56) References Cited

U.S. PATENT DOCUMENTS

2015/0123947 A1* 5/2015 Jubner ................... B62D 1/046
                                                     345/175
2016/0357265 A1* 12/2016 Maani ..................... G06F 3/014
2017/0090567 A1* 3/2017 Allec ...................... G06F 3/014
2017/0308117 A1* 10/2017 Park ................... G06K 9/00355

* cited by examiner

OBJECT STATE DETERMINING APPARATUS AND OBJECT STATE DETERMINING METHOD

BACKGROUND OF THE INVENTION

1. Field of the Invention

The present invention relates to an object state determining apparatus and an object state determining method, and particularly relates to an object state determining apparatus and an object state determining method needs no specific accessories.

2. Description of the Prior Art

Conventionally, if a state of a hand is desired to be detected, for example, open, close or pinch, a hand state detecting apparatus must be provided on the hand. However, such hand state detecting apparatus must be provided on the hand via some specific accessories, for example, a glove. However, such specific accessory must have a size fitting the user's hand, and a suitable size is hard to choose. Also, the hand state detecting apparatus always cannot be used by other users, since the size of the above-mentioned specific accessory is only for one specific user.

Further, the conventional hand state detecting apparatus always provides light sources on the finger, and a camera away from the user is applied to detect the light sources. However, such hand state detecting method maybe interfered by other light sources.

SUMMARY OF THE INVENTION

Therefore, one objective of the present invention is to provide an object state determining apparatus which can be fixed to the object without specific accessories and can efficiently sense the object's action.

Another objective of the present invention is to provide an object state determining method which can efficiently sense the object's action.

One embodiment of the present invention discloses an object state determining apparatus comprising: a first light source, configured to generate first light in a first direction, wherein first reflected light is generated while the first light is emitted to an object; a second light source, configured to generate second light in a second direction, wherein second reflected light is generated while the second light is emitted to the object; at least one light sensor, configured to sense a first light amount of the first reflected light and a second light amount of the second reflected light; and a determining unit, configured to determine a state of the object based on the first light amount and the second light amount.

Another embodiment of the present invention discloses an object state determining apparatus, comprising: (a) emitting first light in a first direction to an object, to generate first reflected light; (b) emitting second light in a second direction to the object, to generate second reflected light; (d) sensing a first light amount of the first reflected light and a second light amount of the second reflected light; and (e) determining a state of the object based on the first light amount and the second light amount.

Another embodiment of the present invention discloses a palm gesture recognition device, which comprises: a light source configured to emit lights in at least two directions; a light sensor comprising a plurality of sensor arrays, wherein each sensor array is configured to receive reflected light in one direction; and a determining unit, configured to determine a palm gesture according to a light intensity level of each sensor array.

In view of above-mentioned embodiments, the object state determining apparatus can be fixed to the object via an adjustable accessory. Additionally, the action of the object can be efficiently detected via sensing the reflected light. Also, the components for the object state determining apparatus are simple such that the cost for the object state determining apparatus can be reduced.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Please note, the components illustrates in following embodiments, such as a unit, a module, or a sensor, can be implemented via hardware (ex. circuit) or hardware with software (ex. processor installed a program).

Figure 1:
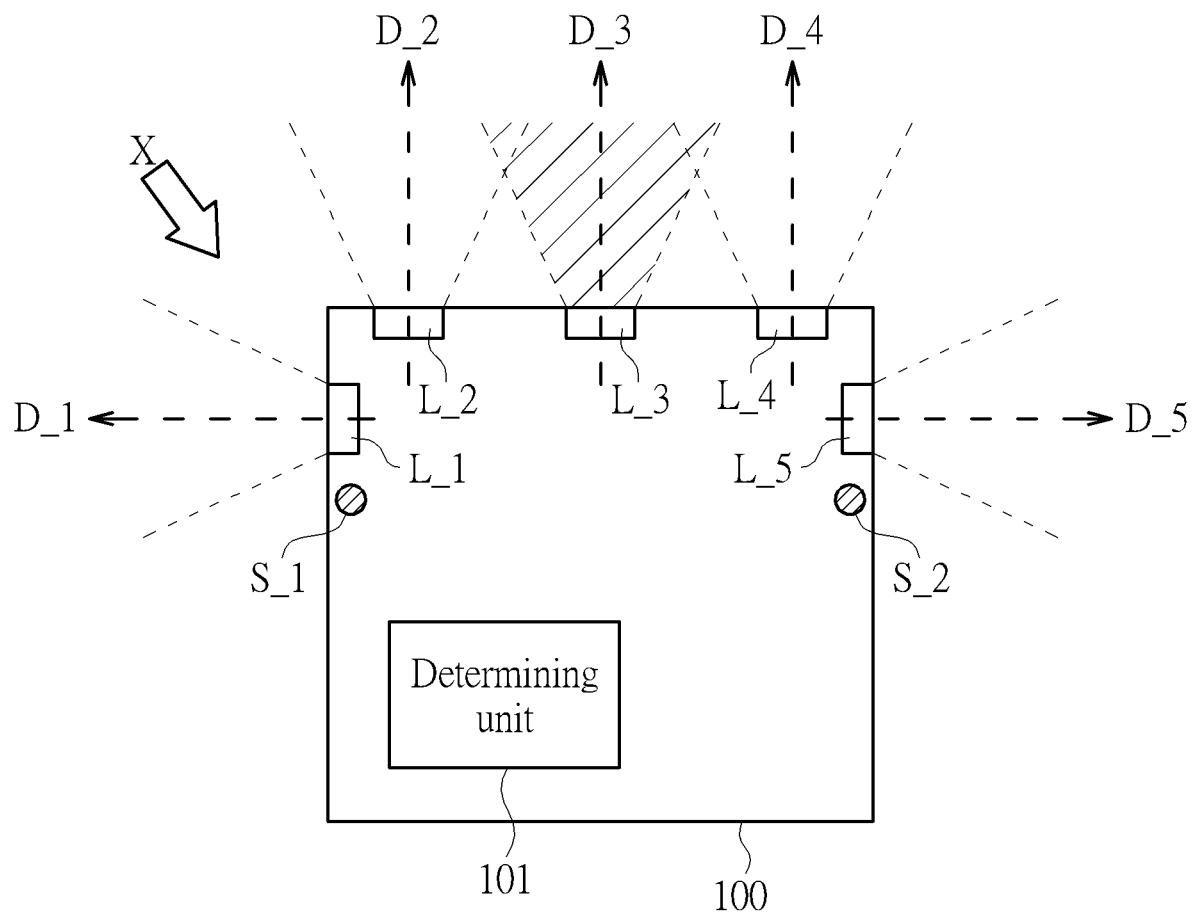
FIG. 1 and FIG. 2 are schematic diagrams illustrating object state determining apparatuses according to embodiments of the present invention.
Figure 2:
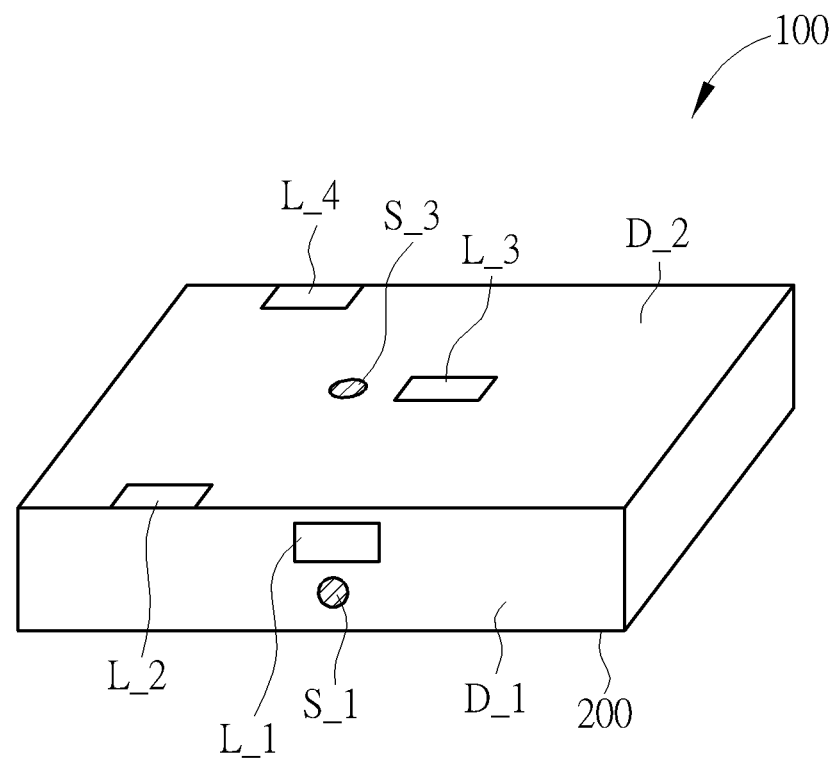

FIG. 1 and FIG. 2 are schematic diagrams illustrating an object state determining apparatus according to embodiments of the present invention. FIG. 2 is a schematic diagram illustrating FIG. 1 following the X direction. Please refer to FIG. 1 and FIG. 2 to understand the concept of the present application for more clear.

As illustrated in FIG. 1, the object state determining apparatus 100 comprises a plurality of light sources $L\_1$-$L\_5$ located at different locations, light sensors $S\_1$, $S\_2$, and a determining unit 101. The light sources $L\_1$-$L\_5$ respectively generate light in the directions $D\_1$-$D\_5$. Reflected light is correspondingly generated while the light is emitted to a hand. The light sensors $S\_1$, $S\_2$, such as cameras or photo diodes, are configured to sense light amount for the reflected light generated by light sources $L\_1$ and $L\_5$. Also, the light sensor $S\_3$ illustrated in FIG. 2 senses light amount for the reflected light generated by light sources $L\_2$-$L\_4$. The determining unit 101 determines a state of the hand based on the light amount for reflected light. In one embodiment, the light sources $L\_1$-$L\_5$ are area light sources, which have wider emitting ranges and more uniform light than point light sources and line light sources.

Figure 3:
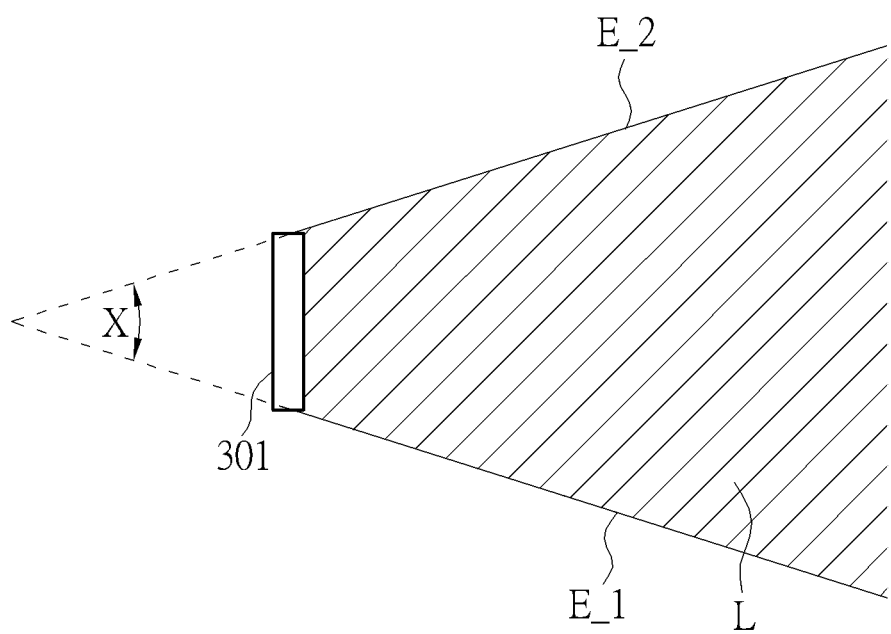
FIG. 3 is a schematic diagram illustrating an area light source according to one embodiment of the present invention.

FIG. 3 is a schematic diagram illustrating an area light source according to one embodiment of the present invention. As illustrated in FIG. 3, the area light source 301 emits an area of light L rather than a light beam. By this way, the hand can be easily detected since the area of light L covers a wide range. Also, in on embodiment, extension lines for the boundary of one emitting direction $E\_1$, $E\_2$ for the area of light L have an angle X, which is between 0° to 45°. For another aspect of explaining, one emitting direction of the area light source 301 could have up to 45 degree included angle.

Based on FIG. 1, FIG. 2, the direction $D\_1$ is perpendicular to the directions $D\_2$, $D\_3$, and $D\_4$. Also, in one embodiment, the directions $D\_2$, $D\_3$, and $D\_4$ are parallel with each other to allow the light sensors $S\_1$, $S\_2$ have better performance in detecting and discriminating lights. It will be appreciated the directions can be adjusted corresponding to different requirements, to make the hand can be more easily detected. In one embodiment, the direction $D\_1$ is adjusted to be a direction which is not perpendicular to the directions $D\_2$, $D\_3$, and $D\_4$. In other words, an emitting angle larger than 0 exists between the direction $D\_1$ and the direction $D\_2$. Also, in one embodiment, the directions $D\_2$, $D\_4$ are adjusted to be non-parallel with each other. Additionally, in one embodiment, the directions $D\_2$, $D\_4$ are adjusted such that an angle between the directions $D\_1$, $D\_2$ is smaller than an angle between the directions $D\_1$, $D\_4$. Furthermore, in one embodiment, the light sources $L\_1$-$L\_5$ respectively have different wave-lengths, thereby the light sensor can determine the source for reflected light more efficiently.

Please refer to FIG. 2, in such embodiment, the light sensor $S\_1$ senses reflected light generated by the light source $L\_1$, and the light sensor $S\_3$ senses reflected light generated by light sources $L\_2$-$L\_4$. However, in another embodiment, each of the light sources respectively has a corresponding light sensor adjacent to the light source to sense reflected light. For example, in one embodiment the light source $L\_2$ has a corresponding light sensor adjacent to the light source $L\_2$ to sense reflected light generated by the light source $L\_2$, and the light source $L\_4$ has a corresponding light sensor adjacent to the light source $L\_4$ to sense reflected light generated by the light source $L\_4$.

In the embodiment that each of the light sources respectively has a corresponding light sensor adjacent to the light source, a palm gesture can be determined according to a light intensity level for the reflected light received by each light sensor. The light intensity level can be, for example, the brightness average or the brightness sum of captured image (ex. image generated by the reflected light) from the corresponding light sensor. In this embodiment, each light intensity level of each corresponding one emitting direction of a light sensor is compared to a corresponding threshold, and then a palm gesture can be recognized by states of the comparison results of each light intensity level and corresponding threshold. Please note the palm gesture here can indicate a gesture that is only formed by a palm, but also can mean the gesture that is formed by a palm and fingers.

To simplify the description, in this case each light source only emits light in one emitting direction. When five comparison results of the five light source $L\_1$~$L\_5$ are high (which means the light intensity level of the light source is higher than the corresponding threshold) then a palm gesture to make a fist could be recognized. In another case, when four comparison results of the four light source $L\_1$~$L\_4$ are high and the other comparison result of the light source $L\_5$ is low (which means the light intensity level of the light source is lower than the corresponding threshold) then a palm gesture to make a thumb up could be recognized.

People skilled in the art could understand the numbers and arrangement of the light sources and corresponding light sensors are adjustable corresponding to what palm gestures need to be recognized.

The above-mentioned embodiment can be summarized as: a palm gesture recognition device, comprising: a light source configured to emit lights in at least two directions (ex. the above-mentioned area light source 301 in FIG. 3); a light sensor (ex. $S\_1$, $S\_3$ in FIG. 2) comprising a plurality of sensor arrays, wherein each sensor array is configured to receive reflected light in one direction. In other words, the sensor arrays are provided to sense reflected for different directions. The sensor arrays can comprise, for example, a plurality of sensing units such as pixels, but not limited. Further, the palm gesture recognition device comprises a determining unit (ex. 801 in FIG. 8), which is configured to determine a palm posture according to a light intensity level of each sensor array.

Also, based on FIG. 2, the object state determining apparatus 100 comprises a case 200, which can have any shape, having a side $D\_1$ and a side $D\_2$ perpendicular to the side $D\_1$. The light source $L\_1$ is located at the side $D\_1$, and the light sources $L\_2$-$L\_4$ are located at the side $D\_2$. The case 200 can be fixed to the user's hand via some adjustable accessories such as an elastic band with a Velcro, or a rope, but not limited.

Figure 4:
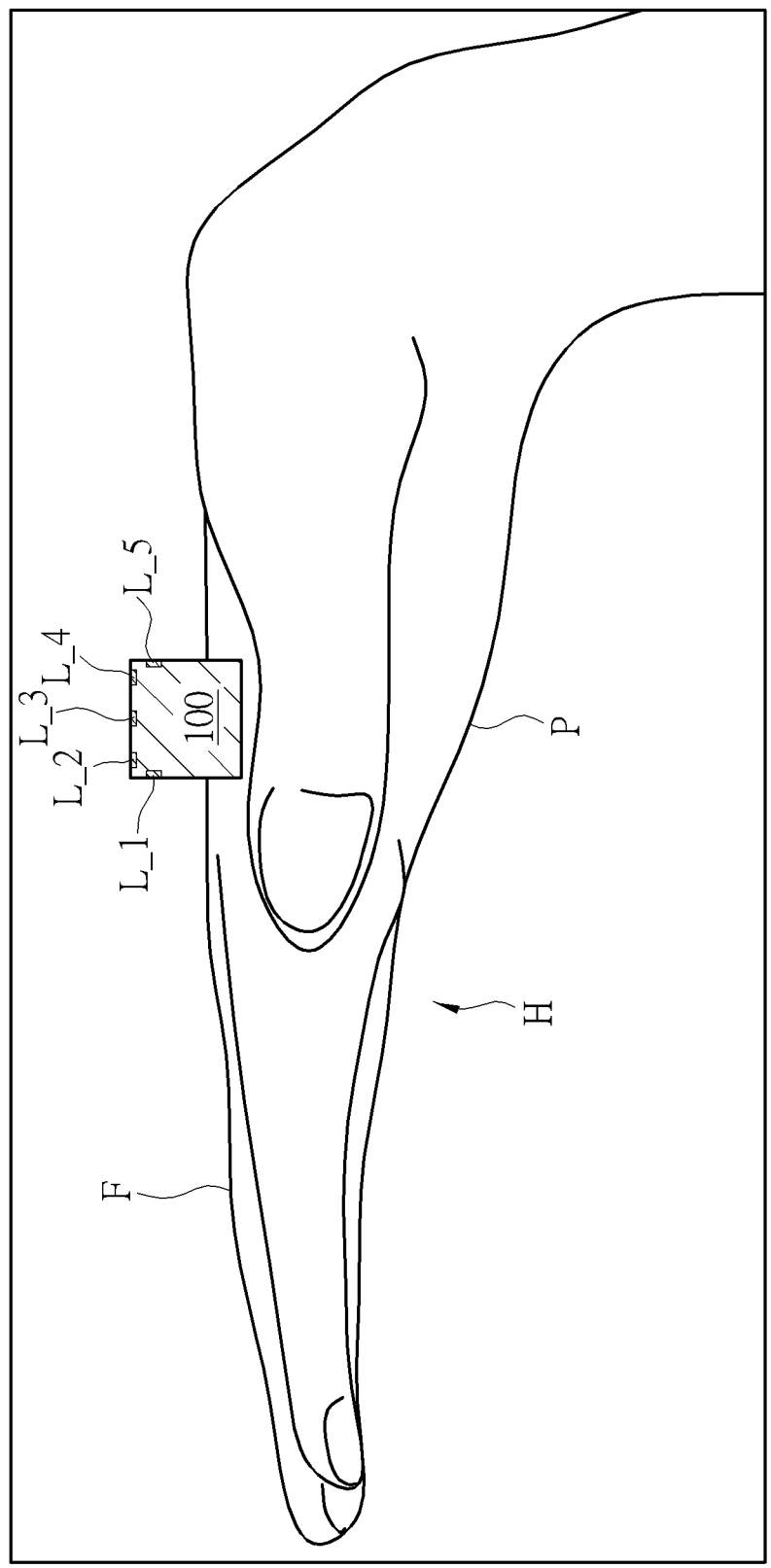
FIG. 4-FIG. 7 are schematic diagrams illustrating the operations for the object state determining method according to embodiments of the present invention.

FIG. 4-FIG. 7 are schematic diagrams illustrating the operations for the object state determining method according to embodiments of the present invention. Please note, for the convenience of explaining, some details for the object state determining apparatus 100 in FIG. 1 and FIG. 2 are omitted. Please refer to FIG. 1-FIG. 2 and FIG. 4-FIG. 7 to understand the embodiments illustrated in FIG. 4-FIG. 7 for more clear. As illustrated in FIG. 4, the hand H with fingers H and a palm P is open, and the object state determining apparatus 100 is located on the palm P. The object state determining apparatus 100 can be fixed to the palm P via some adjustable accessories, such as an elastic band with a Velcro, or a rope, but not limited. Accordingly, in such case, the direction $D\_1$ in FIG. 1 is substantially parallel with the palm P, and the direction $D\_2$ in FIG. 1 is substantially perpendicular to the palm P. In one embodiment, the description "substantially parallel" means the angle between the direction $D\_1$ in FIG. 1 and the palm P is smaller than 30°. Also, the description "substantially perpendicular to" means the angle between the direction $D\_2$ in FIG. 1 and a normal line to the palm is smaller than 60°.

In the state of FIG. 4, the light from the light sources $L\_1$-$L\_5$ is not emitted to the finger F and the palm H or only little light is emitted to the finger F and the palm H, thus light amount for reflected light received by the light sensor of the object state determining apparatus 100 is low. Therefore, the determining unit 101 determines the hand is in an open state if the light amount for reflected light of the light sources $L\_1$-$L\_5$ is smaller than a threshold value.

Figure 5:
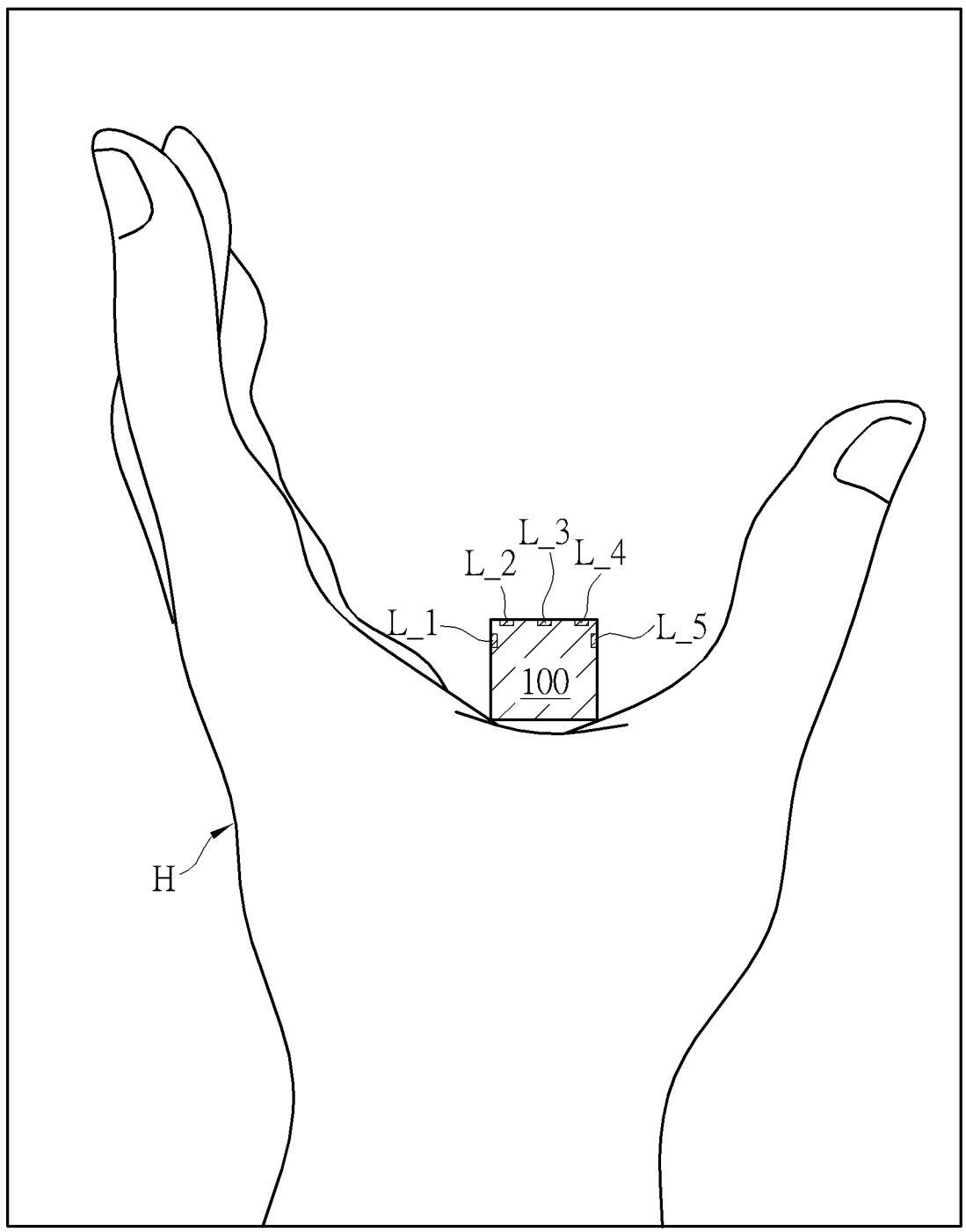
Figure 6:
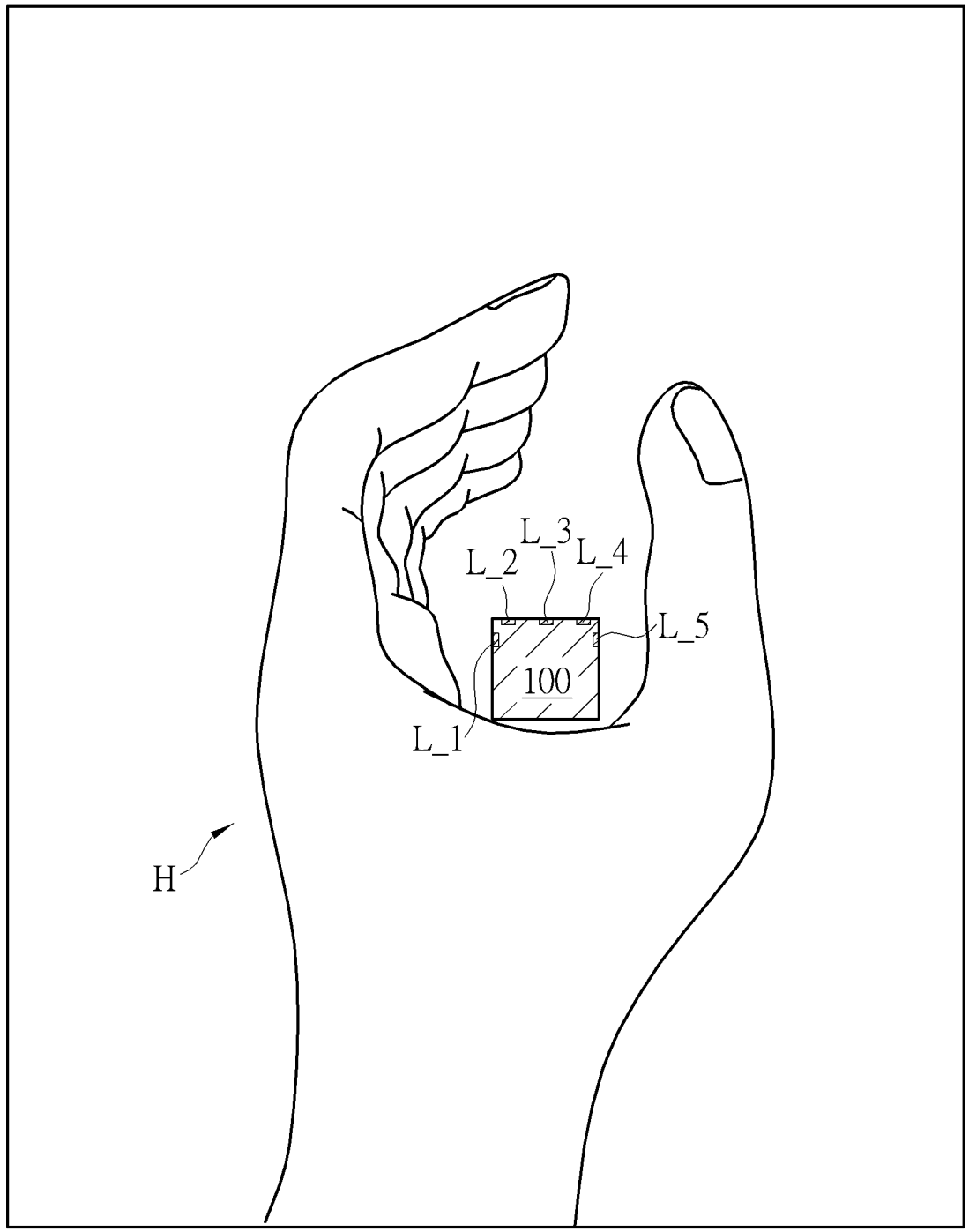

In the state of FIG. 5, the hand is closer (ex. performing a catching action or at the beginning for making a fist), thus light amounts of the reflected light for the light sources $L\_1$, $L\_5$ are larger. Accordingly, the determining unit 101 determines the hand H is in a closed state while the light amount of the reflected light for the light sources $L\_1$ or $L\_5$ is larger than a threshold value. In the state of FIG. 6, the hand is much closer (i.e. performing a firmly catching action or at the ending for making a fist), thus light amounts of the reflected light for the light sources $L\_1$, $L\_2$, $L\_3$ and $L\_5$ are larger. Accordingly, the determining unit 101 determines the hand H is in a closed state while the light amount of the reflected light for the light sources L_1, L_2, L_3 and L_5 is larger than a threshold value.

Figure 7:
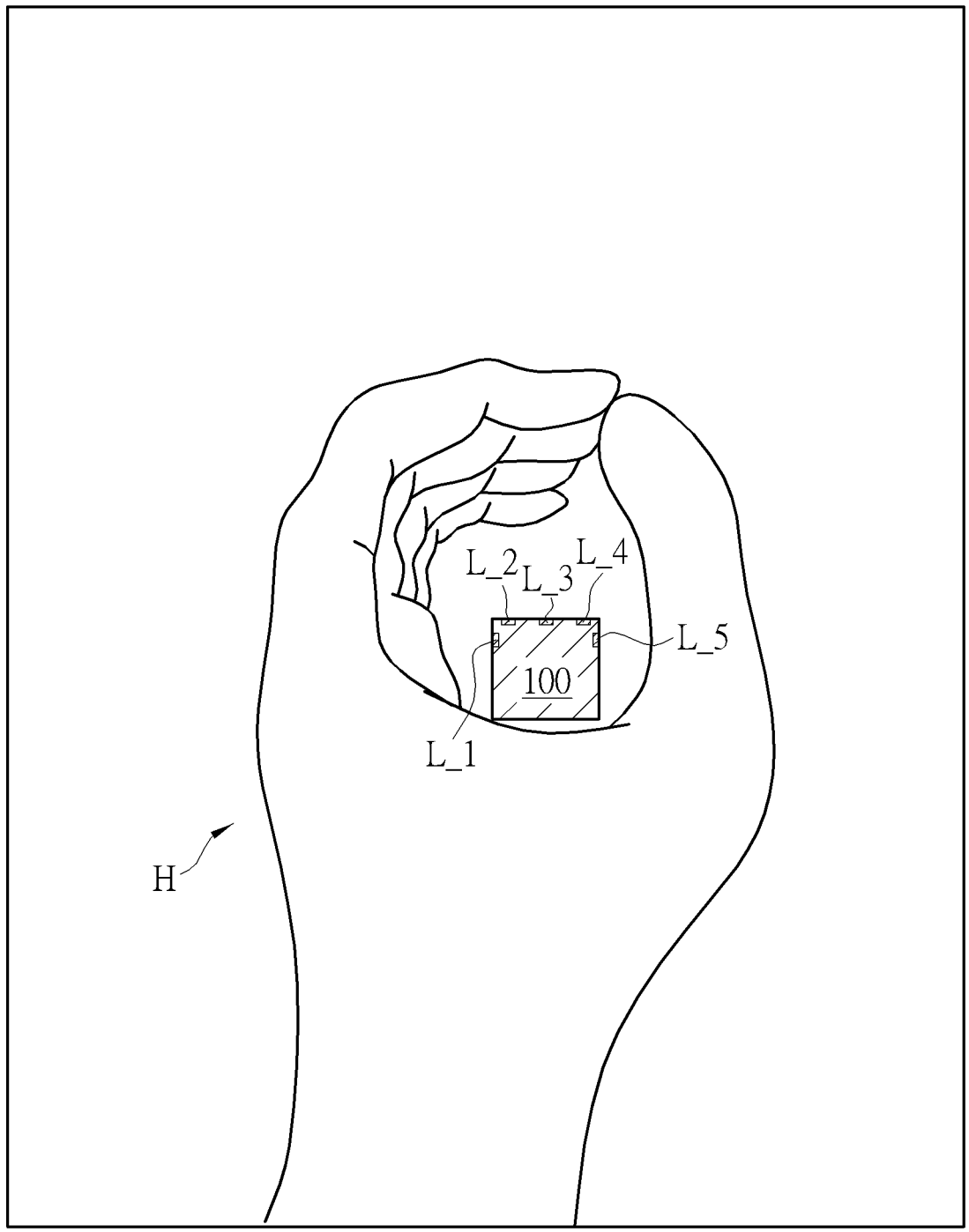

In the state of FIG. 7, the hand H is in a pinching state, which means the hand H performs a pinching action. In such state, light amounts of the reflected light for the light sources L_1-L_5 are large, thus the determining unit 101 determines the hand H is in a pinching state while the light amount of the reflected light for the light sources L_1-L_5 is larger than a threshold value. In one embodiment, another type of device is further applied to help determining the pinching state. For example, a pressure detecting device can be provided. The determining unit 101 determines the hand H is in a pinching state while the light amount of the reflected light for the light sources L_1-L_5 is larger than a threshold value and the user presses the pressure detecting device.

Figure 8:
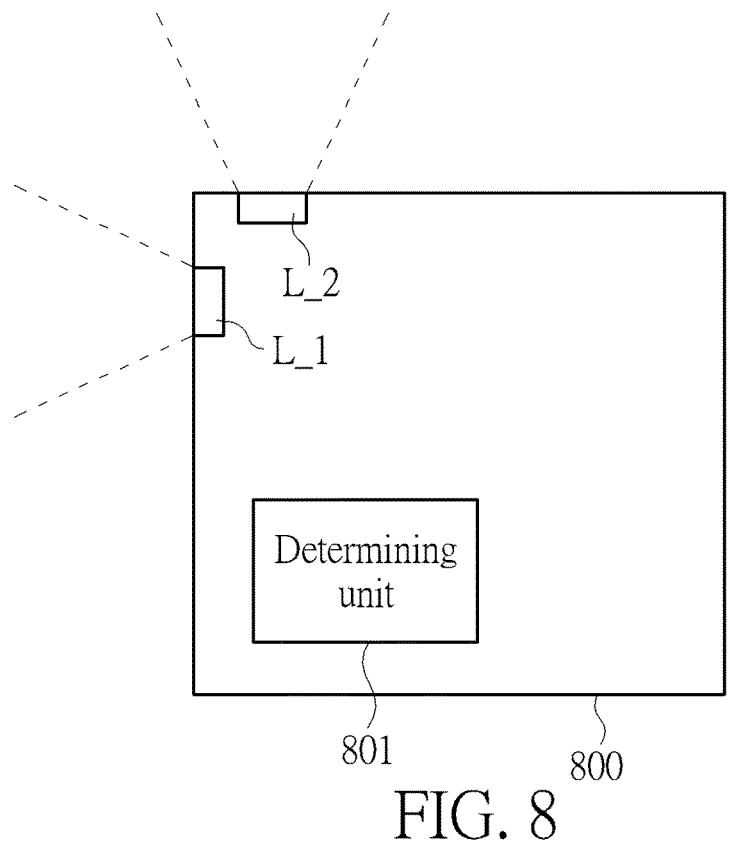
FIG. 8-FIG. 10 are schematic diagrams illustrating object state determining apparatuses according to other embodiments of the present invention.
Figure 9:
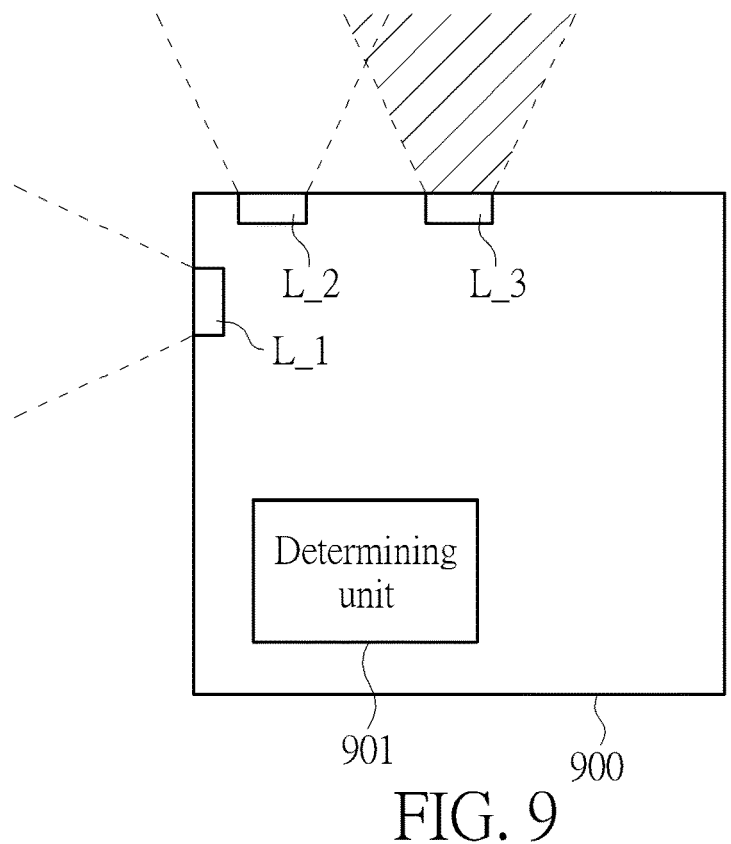
Figure 10:
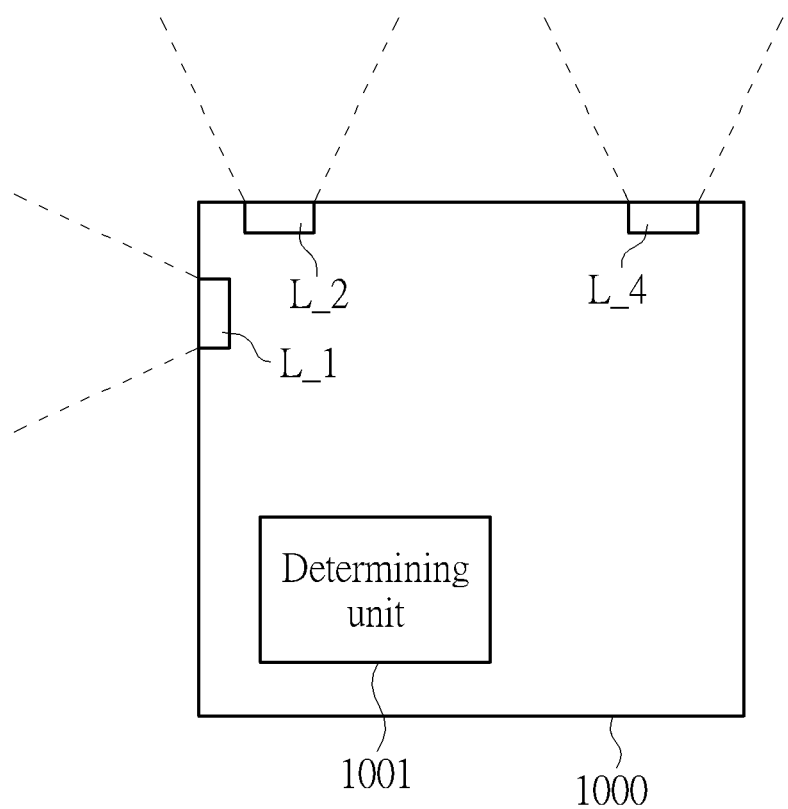

Please note, the number and the arrangement for the light sources are not limited to the embodiment illustrated in FIG. 1. FIG. 8-FIG. 10 are schematic diagrams illustrating object state determining apparatuses according to other embodiments of the present invention. In the embodiment of FIG. 8, the object state determining apparatus 800 comprises a determining unit 801 and light sources L_1 and L_2. In such embodiment, the determining unit 801 determines the hand is in an open state while the light amounts for reflected light generated by the light sources L_1 and L_2 are smaller than a first threshold value, based on the embodiment of FIG. 4. Also, the determining unit 801 determines the hand is in a closed state while the light amount for reflected light generated by the light sources L_1 or L_2 is larger than a second threshold value, based on the embodiment of FIG. 5 and FIG. 6. Please note the first threshold value and the second threshold value can be the same or different.

In the embodiment of FIG. 9, the object state determining apparatus 900 comprises a determining unit 901 and light sources L_1-L_3. In such embodiment, the determining unit 901 determines the object is in a closed state while the light amount for reflected light generated by the light source L_2 is larger than the second threshold value and the light amount for reflected light generated by the light source L_3 is larger than a third threshold value, depending on the embodiment of FIG. 6. Please note the first threshold value, the second threshold value and the third threshold value can be the same or different.

In the embodiment of FIG. 10, the object state determining apparatus 1000 comprises a determining unit 1001 and light sources L_1, L_2 and L_4. In such embodiment, the determining unit 1001 determines the object is in a pinching state while the light amount for reflected light generated by the light source L_2 is larger than the second threshold value and the light amount for reflected light generated by the light source L_4 is larger than a fourth threshold value, depending on the embodiment of FIG. 7. Please note the first threshold value, the second threshold value, the third threshold value and the fourth threshold value can be the same or different.

Please note the embodiments illustrated in FIG. 8-FIG. 10 are only for example. Any variation based on the embodiment illustrated in FIG. 1 should also fall in the scope of the present invention.

Figure 11:
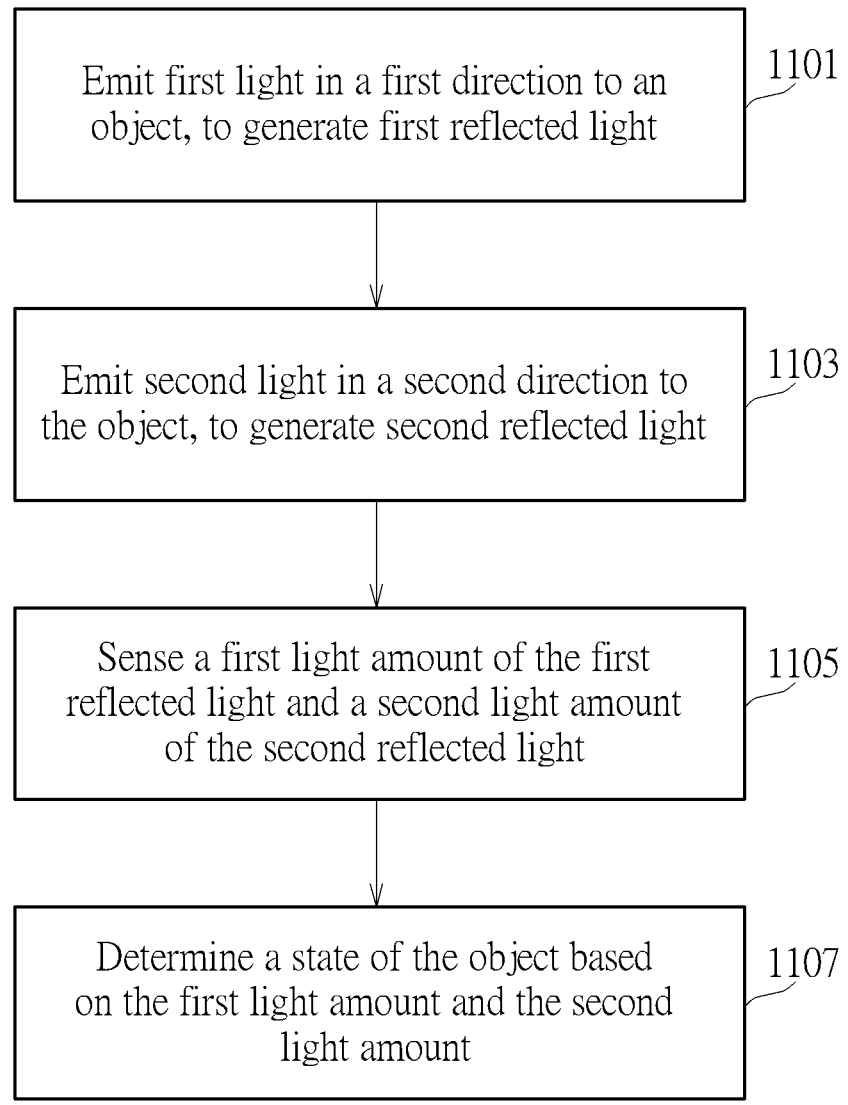
FIG. 11 is a schematic diagram illustrating an object state determining method according to one embodiment of the present invention.

Besides, in above-mentioned embodiments, a hand is taken as an example for explaining. However, the hand can be replaced with any other object. Also, the above-mentioned methods are not limited to detect the open state, the closed state and the pinching state of the hand. The open state, the closed state and the pinching state can be named for other states, or can be separated into more detail states, or be combined to fewer stated. Such combinations should fall in the scope of the present invention. Therefore, an object state determining method illustrated in FIG. 11 can be acquired, which comprises following steps:

Step 1101

Emit first light in a first direction to an object, to generate first reflected light. (ex. L_1 in FIG. 1 and FIG. 8)

Step 1103

Emit second light in a second direction to the object, to generate second reflected light. (ex. L_2 in FIG. 1 and FIG. 8).

Step 1105

Sense a first light amount of the first reflected light and a second light amount of the second reflected light.

Step 1107

Determine a state of the object based on the first light amount and the second light amount.

Other detail steps can be acquired based on above-mentioned embodiments, thus are omitted for brevity here.

In view of above-mentioned embodiments, the object state determining apparatus can be fixed to the object via an adjustable accessory. Additionally, the action of the object can be efficiently detected via sensing the reflected light. Also, the components for the object state determining apparatus are simple such that the cost for the object state determining apparatus can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object state determining apparatus, comprising:
a first light source, configured to generate first light in a first direction, wherein first reflected light is generated while the first light is emitted to at least one first finger of a hand;
a second light source, configured to generate second light in a second direction, wherein second reflected light is generated while the second light is emitted to at least one second finger of the hand;
at least one light sensor, configured to sense a first light amount of the first reflected light and a second light amount of the second reflected light; and
a determining unit, configured to determine a closed state of the hand based on the first light amount and the second light amount while the object state determining apparatus is located on a palm of the hand, wherein the closed state is formed by at least one of the first finger, at least one of the second finger and the palm;
wherein the object state determining apparatus further comprises:
a third light source, configured to generate third light in a third direction, wherein third reflected light is generated while the third light is emitted to the hand;
wherein the second light source and the third light source are located at different locations of the object state determining apparatus;
wherein the light sensor senses a third light amount of the third reflected light;
wherein the determining unit determines the hand is in a closed state while the second light amount is larger than the second threshold value and the third light amount is larger than a third threshold value.

2. The object state determining apparatus of claim 1, wherein the determining unit determines the hand is in a first state while the first light amount and the second light amount are smaller than a first threshold value.

3. The object state determining apparatus of claim 2, wherein the first state is that the hand is open.

4. The object state determining apparatus of claim 3, wherein the first direction is substantially parallel with the palm, and the second direction is substantially perpendicular to the palm.

5. The object state determining apparatus of claim 1, wherein the first direction and the second direction are not parallel with each other, wherein the second direction and the third direction are parallel with each other, wherein the first light source, the second light source and the third light source are area light sources.

6. The object state determining apparatus of claim 1, wherein the first light and the second light have different wave lengths.

7. The object state determining apparatus of claim 1, wherein the at least one light sensor comprises a first light sensor, wherein the first light sensor is configured to sense the first reflected light and the second reflected light.

8. The object state determining apparatus of claim 1, wherein the at least one light sensor comprises a first light sensor adjacent to the first light source and a second light sensor adjacent to the second light source, wherein the first light sensor is configured to sense the first reflected light and the second light sensor is configured to sense the second reflected light.

9. The object state determining apparatus of claim 1, wherein the first direction and the second direction are perpendicular.

10. The object state determining apparatus of claim 9, wherein the first light source and the second light source are area sources.

11. The object state determining apparatus of claim 1, wherein an emitting angle larger than 0 exists between the first direction and the second direction.

12. An object state determining method applied to an object state determining apparatus, comprising:
   (a) emitting first light in a first direction to at least one first finger of a hand, to generate first reflected light;
   (b) emitting second light in a second direction to at least one second finger of the hand, to generate second reflected light;
   (d) sensing a first light amount of the first reflected light and a second light amount of the second reflected light; and
   (e) determining a closed state of the hand based on the first light amount and the second light amount while the object state determining apparatus is located on a palm of the hand, wherein the closed state is formed by at least one of the first finger, at least one of the second finger, and the palm;
   wherein the object state determining method further comprises:
   emitting third light in a third direction to the hand, to generate third reflected light;
   sensing a third light amount of the third reflected light;
   wherein the step (e) determines the hand is in a closed state while the second light amount is larger than the second threshold value and the third light amount is larger than the third threshold value.

13. The object state determining method of claim 12, wherein the step (e) determines the hand is in a first state while the first light amount and the second light amount are smaller than a first threshold value.

14. The object state determining method of claim 13, wherein the first state is that the hand is open.

15. The object state determining method of claim 14, wherein the first direction is substantially parallel with the palm, and the second direction is substantially perpendicular to the palm.

16. The object state determining method of claim 12, wherein the first direction and the second direction are not parallel with each other, wherein the second direction and the third direction are parallel with each other, wherein the first light, the second light and the third light are generated from area light sources.

17. The object state determining method of claim 12, wherein the first light and the second light have different wave lengths.

18. An object state determining apparatus, comprising:
   a first light source, configured to generate first light in a first direction, wherein first reflected light is generated while the first light is emitted to at least one first finger of a hand;
   a second light source, configured to generate second light in a second direction, wherein second reflected light is generated while the second light is emitted to at least one second finger of the hand;
   at least one light sensor, configured to sense a first light amount of the first reflected light and a second light amount of the second reflected light; and
   a determining unit, configured to determine a closed state of the hand based on the first light amount and the second light amount while the object state determining apparatus is located on a palm of the hand, wherein the closed state is formed by at least one of the first finger, at least one of the second finger and the palm;
   wherein the object state determining apparatus further comprises:
   a fourth light source, configured to generate fourth light in a fourth direction, wherein fourth reflected light is generated while the fourth light is emitted to the hand;
   wherein the first light source, the second light source and the fourth light source are located at different locations of the object state determining apparatus;
   wherein the light sensor senses a fourth light amount of the fourth reflected light;
   wherein the determining unit determines the hand is in a fourth state while the fourth light amount is larger than a fourth threshold value and the second light amount is larger than the second threshold value.

19. The object state determining apparatus of claim 18, wherein the determining unit determines the hand is in a first state while the first light amount and the second light amount are smaller than a first threshold value.

20. The object state determining apparatus of claim 19, wherein the first state is that the hand is open, and the fourth state is that the hand is pinching.

21. The object state determining apparatus of claim 20, wherein the first light is parallel with the palm, wherein the second direction and the fourth direction are perpendicular to the palm.

22. The object state determining apparatus of claim 18, wherein the first direction and the second direction are not parallel with each other, wherein the second direction and the fourth direction are not parallel with each other, wherein the first light source, the second light source and the fourth light source are area light sources, wherein an angle between the first direction and the second direction is smaller than an angle between the first direction and the fourth direction.

23. An object state determining apparatus, comprising:
a first light source, configured to generate first light in a first direction, wherein first reflected light is generated while the first light is emitted to at least one first finger of a hand;
a second light source, configured to generate second light in a second direction, wherein second reflected light is generated while the second light is emitted to at least one second finger of the hand;
at least one light sensor, configured to sense a first light amount of the first reflected light and a second light amount of the second reflected light; and
a determining unit, configured to determine a closed state of the hand based on the first light amount and the second light amount while the object state determining apparatus is located on a palm of the hand, wherein the closed state is formed by at least one of the first finger, at least one of the second finger and the palm;
wherein the object state determining apparatus comprises a case having a first side and a second side perpendicular to the first side, wherein the first light source is located at the first side and the second light source is located at the second side.

24. The object state determining apparatus of claim 23, further comprising:
a third light source located at the second side, configured to generate third light in a third direction, wherein third reflected light is generated while the third light is emitted to the hand;
wherein the light sensor senses a third light amount of the third reflected light;
wherein the determining unit further determines the closed state of the hand based on the third light amount.

25. The object state determining apparatus of claim 24, further comprising:
a fourth light source located at the second side, configured to generate fourth light in a fourth direction, wherein fourth reflected light is generated while the fourth light is emitted to the hand;
wherein the light sensor senses a fourth light amount of the fourth reflected light;
wherein the determining unit further determines the previously presented closed state of the hand based on the fourth light amount.

26. An object state determining method applied to an object state determining apparatus, comprising:
(a) emitting first light in a first direction to at least one first finger of a hand, to generate first reflected light;
(b) emitting second light in a second direction to at least one second finger of the hand, to generate second reflected light;
(d) sensing a first light amount of the first reflected light and a second light amount of the second reflected light; and
(e) determining a closed state of the hand based on the first light amount and the second light amount while the object state determining apparatus is located on a palm of the hand, wherein the closed state is formed by at least one of the first finger, at least one of the second finger, and the palm;
wherein the object state determining method further comprises:
emitting fourth light in a fourth direction to the hand, to generate third reflected light;
sensing a fourth light amount of the fourth reflected light;
wherein the step (e) determines the hand is in a fourth state while the fourth light amount is larger than a fourth threshold value and the second light amount is larger than the second threshold value.

27. The object state determining method of claim 26, wherein the step (e) determines the hand is in a first state while the first light amount and the second light amount are smaller than a first threshold value.

28. The object state determining method of claim 27, wherein the first state is that the hand is open, and the fourth state is that the hand is pinching.

29. The object state determining method of claim 28, wherein the first light is parallel with the palm, wherein the second direction and the fourth direction are perpendicular to the palm.

30. The object state determining method of claim 26, wherein the first direction and the second direction are not parallel with each other, wherein the second direction and the fourth direction are not parallel with each other, wherein the first light source, the second light source and the fourth light source are area light sources, wherein an angle between the first direction and the second direction is smaller than an angle between the first direction and the fourth direction.

* * * * *